US011129176B2

(12) United States Patent
Liu

(10) Patent No.: US 11,129,176 B2
(45) Date of Patent: Sep. 21, 2021

(54) METHOD AND APPARATUS FOR CONFIGURING SIGNAL PERIOD

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 94 days.

(21) Appl. No.: 16/496,343

(22) PCT Filed: Mar. 28, 2017

(86) PCT No.: PCT/CN2017/078430
§ 371 (c)(1),
(2) Date: Sep. 20, 2019

(87) PCT Pub. No.: WO2018/176218
PCT Pub. Date: Oct. 4, 2018

(65) Prior Publication Data
US 2020/0196328 A1 Jun. 18, 2020

(51) Int. Cl.
*H04W 72/12* (2009.01)
*H04W 48/10* (2009.01)
*H04W 72/04* (2009.01)

(52) U.S. Cl.
CPC ....... *H04W 72/1252* (2013.01); *H04W 48/10* (2013.01); *H04W 72/0486* (2013.01)

(58) Field of Classification Search
None
See application file for complete search history.

(56) References Cited

U.S. PATENT DOCUMENTS

2003/0163579 A1 8/2003 Knauerhase et al.
2011/0053617 A1* 3/2011 Lee ....................... H04W 68/00 455/458

(Continued)

FOREIGN PATENT DOCUMENTS

CN 102740237 A 10/2012
CN 104038983 A 9/2014

(Continued)

OTHER PUBLICATIONS

Extended Search Report issued to European Patent Application No. 179030796, dated Jan. 7, 2020, (10p).

(Continued)

*Primary Examiner* — Anh Ngoc M Nguyen
(74) *Attorney, Agent, or Firm* — Arch & Lake LLP

(57) ABSTRACT

A method and an apparatus for configuring a signal period are provided. The method includes: configuring a first period for the target base station broadcasting a target signal according to a number of terminals currently accessing the target base station when a terminal currently is to access the target base station, where the target base station is to perform hotspot coverage and managed by the macro base station, and the target signal is to control the terminal to access the target base station; and sending first period configuration information to the target base station and the terminal, so that the target base station broadcasts the target signal in the first period. The first period for the target base station broadcasting the target signal is flexibly configured by the macro base station according to the number of terminals accessing the target base station.

16 Claims, 12 Drawing Sheets

Macro base station
11
Macro base station
11
Small base
station 12
Small base
station 12
Small base
station 12
Macro base station
11

(56) References Cited

U.S. PATENT DOCUMENTS

| | | | | |
|---|---|---|---|---|
| 2011/0092212 | A1 | 4/2011 | Kubota | |
| 2011/0312370 | A1* | 12/2011 | Kim | H04W 52/0206 455/525 |
| 2013/0252616 | A1 | 9/2013 | Murakami | |
| 2013/0343270 | A1* | 12/2013 | Abe | H04W 36/0005 370/328 |
| 2016/0127960 | A1* | 5/2016 | Park | H04W 36/04 370/332 |
| 2016/0295500 | A1 | 10/2016 | Liu | |

FOREIGN PATENT DOCUMENTS

| | | | |
|---|---|---|---|
| CN | 105764142 | A | 7/2016 |
| CN | 106211342 | A | 12/2016 |
| EP | 2800366 | A1 | 11/2014 |

OTHER PUBLICATIONS

Written Opinion of PCT Application No. PCT/CN2017/078430 dated Aug. 25, 2017, (4p).

International Search Report Issued in Application No. PCT/CN2017/078430 dated Aug. 25, 2017, (4p).

The First Office Action issued to Chinese Patent Application No. 201780000182.4 dated Sep. 2, 2019, with English translation (12p).

* cited by examiner

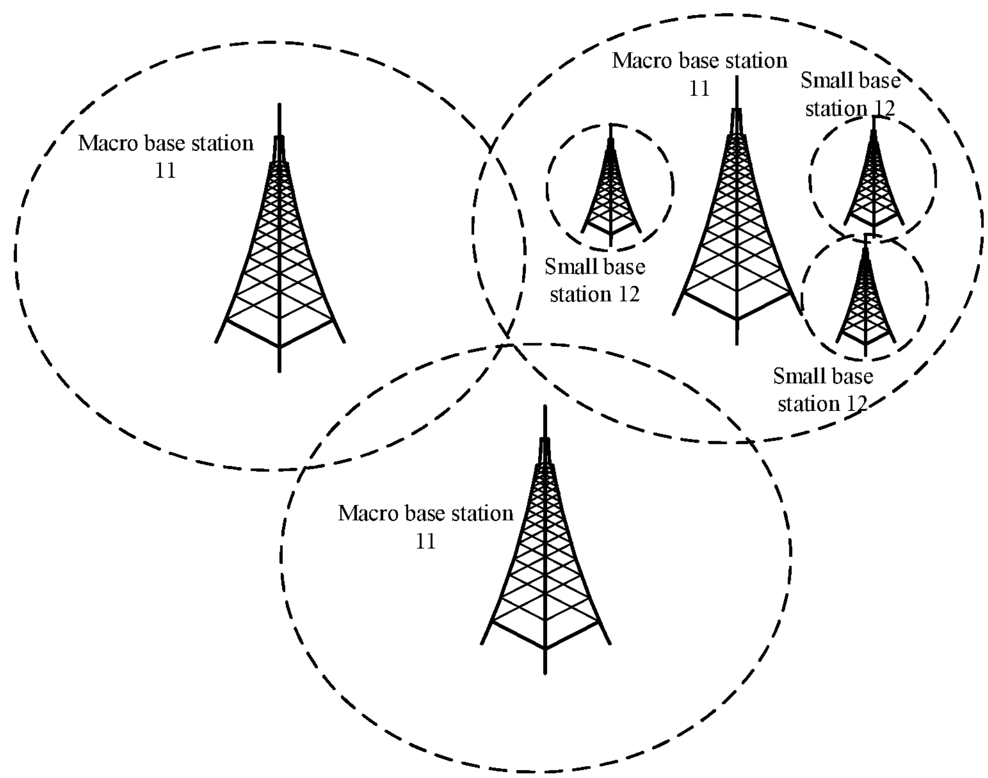

FIG.1

Configure a first period for the target base station broadcasting a target signal according to a number of terminals currently accessing a target base station when it is determined that a terminal currently accessing the macro base station is going to access the target base station — 101

Send first period configuration information to the target base station and the terminal, where the first period configuration information is used to control the target base station to broadcast the target signal in the first period — 102

FIG.2

METHOD AND APPARATUS FOR CONFIGURING SIGNAL PERIOD

CROSS REFERENCE TO RELATED APPLICATIONS

The present application is the U.S. national phase of PCT Application No. PCT/CN2017/078430 filed on Mar. 28, 2017, which is incorporated herein by reference in its entirety.

TECHNICAL FIELD

The present disclosure relates to the field of communications, and in particular to a method and an apparatus for configuring a signal period.

BACKGROUND

Standardization relating to a 5G, i.e., New Radio (NR) network is being carried out in the 3rd Generation Partnership Project (3GPP). In a 5G system, a macro base station with a lower signal transmission frequency may be firstly used for coverage, and a small base station with a higher signal transmission frequency may be further used for hotspot coverage. Optionally, a macro base station in Long Term Evolution (LTE) may be used for coverage, and a non-independent 5G small base station managed by the macro base station may be further used for hotspot coverage.

However, in the current system, whether there is a terminal that needs to access a 5G small base station for performing hotspot coverage, the 5G small base station broadcasts a signal for controlling terminals to access the 5G small base station itself in a fixed period. In this case, resource wastes are caused, which is not conducive energy saving of the 5G system and increases interference of the entire 5G system.

SUMMARY

To overcome the problems in the related art, examples of the present disclosure provide a method and an apparatus for configuring a signal period.

According to a first aspect of an example of the present disclosure, a method of configuring a signal period is provided, and the method is applied to a macro base station. The method includes:

when it is determined that a terminal currently accessing the macro base station is going to access a target base station, configuring a first period for the target base station broadcasting a target signal according to a number of terminals currently accessing the target base station, where the target base station is a base station that is used for hotspot coverage and managed by the macro base station, and the target signal is used to control the terminal to access the target base station; and sending first period configuration information to the target base station and the terminal, where the first period configuration information is used to control the target base station to broadcast the target signal in the first period.

Optionally, configuring the first period for the target base station broadcasting the target signal according to the number of terminals currently accessing the target base station includes:

when the number of terminals currently accessing the target base station is zero, configuring the first period for the target base station broadcasting the target signal within a preset period range; and when the number of terminals currently accessing the target base station is not zero, taking a current period configured by the macro base station for the target base station broadcasting the target signal as the first period.

Optionally, the method further includes:

sending a notification message carrying effective time information to the terminal, where the effective time information is used to indicate that the target base station will start broadcasting the target signal in the first period after a first preset time period is passed.

Optionally, the method further includes:

after the terminal accesses the target base station based on the target signal, obtaining a re-configured second period when it is determined that a period for the target base station broadcasting the target signal is to be re-configured; and sending second period configuration information to the target base station and the terminal, where the second period configuration information is used to control the target base station to broadcast the target signal in the second period.

Optionally, the method further includes:

after it is determined that the terminal leaves a geographical range covered by the target base station, configuring a third period for the target base station broadcasting the target signal according to the number of terminals currently accessing the target base station; and sending third period configuration information to the target base station, where the third period configuration information is used to control the target base station to broadcast the target signal in the third period.

Optionally, configuring the third period for the target base station broadcasting the target signal according to the number of terminals currently accessing the target base station includes:

when the number of terminals currently accessing the target base station is zero, taking a maximum value within a preset period range as the third period for the target base station broadcasting the target signal; and when the number of terminals currently accessing the target base station is not zero, taking a current period configured by the macro base station for the target base station broadcasting the target signal as the third period, or configuring the third period for the target base station broadcasting the target signal within the preset period range.

According to a second aspect of an example of the present disclosure, a method of configuring a signal period is provided, and the method is applied to a target base station that is used for hotspot coverage and managed by a macro base station. The method includes:

receiving first period configuration information, where the first period configuration information is sent by the macro base station when it is determined that a terminal currently accessing the macro base station is going to access the target base station; and broadcasting a target signal in a first period indicated by the first period configuration information, where the target signal is used to control the terminal to access the target base station.

Optionally, broadcasting the target signal in the first period indicated by the first period configuration information includes:

after a first preset time period is passed, broadcasting the target signal in the first period indicated by the first period configuration information.

Optionally, the method further includes:

receiving second period configuration information sent by the macro base station when the macro base station determines that a period for the target base station broadcasting the target signal is to be re-configured after the terminal accesses the target base station based on the target signal; and broadcasting the target signal in a second period indicated by the second period configuration information.

Optionally, the method further includes:

receiving third period configuration information send by the macro base station after the macro base station determines that the terminal leaves a geographical range covered by the target base station; and broadcasting the target signal in a third period indicated by the third period configuration information.

Optionally, broadcasting the target signal in the third period indicated by the third period configuration information includes:

after a second preset time period is passed, broadcasting the target signal in the third period indicated by the third period configuration information.

According to a third aspect of an example of the present disclosure, an apparatus for configuring a signal period is provided, and the apparatus is applied to a macro base station.

The apparatus includes:

a first period determining module, configured to set a first period for a target base station broadcasting a target signal according to a number of terminals currently accessing the target base station when it is determined that a terminal currently accessing the macro base station is going to access the target base station, where the target base station is a base station that is used for hotspot coverage and managed by the macro base station, and the target signal is used to control the terminal to access the target base station; and a first sending module, configured to send first period configuration information to the target base station and the terminal, where the first period configuration information is used to control the target base station to broadcast the target signal in the first period.

Optionally, the first period determining module includes:

a first determining sub-module, configured to set the first period for the target base station broadcasting the target signal within a preset period range when the number of terminals currently accessing the target base station is zero; and a second determining sub-module, configured to take a current period configured by the macro base station for the target base station broadcasting the target signal as the first period when the number of terminals currently accessing the target base station is not zero.

Optionally, the apparatus further includes:

a second sending module, configured to send a notification message carrying effective time information to the terminal, where the effective time information is used to indicate that the target base station will start broadcasting the target signal in the first period after a first preset time period is passed.

Optionally, the apparatus further includes:

a second period determining module, configured to obtain a re-configured second period when it is determined that a period for the target base station broadcasting the target signal is to be re-configured after the terminal accesses the target base station based on the target signal; and a third sending module, configured to send second period configuration information to the target base station and the terminal, where the second period configuration information is used to control the target base station to broadcast the target signal in the second period.

Optionally, the apparatus further includes:

a third period determining module, configured to set a third period for the target base station broadcasting the target signal according to the number of terminals currently accessing the target base station after it is determined that the terminal leaves a geographical range covered by the target base station; and a fourth sending module, configured to send third period configuration information to the target base station, where the third period configuration information is used to control the target base station to broadcast the target signal in the third period.

Optionally, the third period determining module includes:

a third determining sub-module, configured to take a maximum value within a preset period range as the third period for the target base station broadcasting the target signal when the number of terminals currently accessing the target base station is zero; and a fourth determining sub-module, configured to, when the number of terminals currently accessing the target base station is not zero, take a current period configured by the macro base station for the target base station broadcasting the target signal as the third period as the third period or set the third period for the target base station broadcasting the target signal within the preset period range.

According to a fourth aspect of an example of the present disclosure, an apparatus for configuring a signal period is provided, and the apparatus is applied to a target base station that is used for hotspot coverage and managed by a macro base station. The apparatus includes:

a first receiving module, configured to receive first period configuration information, where the first period configuration information is sent by the macro base station when it is determined that a terminal currently accessing the macro base station is going to access the target base station; and a first broadcasting module, configured to broadcast a target signal in a first period indicated by the first period configuration information, where the target signal is used to control the terminal to access the target base station.

Optionally, the first broadcasting module includes:

a first broadcasting sub-module, configured to broadcast the target signal in the first period indicated by the first period configuration information after a first preset time period is passed.

Optionally, the apparatus further includes:

a second receiving module, configured to receive second period configuration information sent by the macro base station when the macro base station determines that a period for the target base station broadcasting the target signal is to be re-configured after the terminal accesses the target base station based on the target signal; and a second broadcasting module, configured to broadcast the target signal in a second period indicated by the second period configuration information.

Optionally, the apparatus further includes:

a third receiving module, configured to receive third period configuration information send by the macro base station after the macro base station determines that the terminal leaves a geographical range covered by the target base station; and a third broadcasting module, configured to broadcast the target signal in a third period indicated by the third period configuration information.

Optionally, the third broadcasting module includes:

a second broadcasting sub-module, configured to broadcast the target signal in the third period indicated by the third period configuration information after a second preset time period is passed.

According to a fifth aspect of an example of the present disclosure, an apparatus for configuring a signal period is provided, including:

a processor; and a memory for storing processor-executable instructions;

where the processor is configured to:

set a first period for the target base station broadcasting a target signal according to a number of terminals currently accessing a target base station when it is determined that a terminal currently accessing the macro base station is going to access the target base station, where the target base station is a base station that is used for hotspot coverage and managed by the macro base station, and the target signal is used to control the terminal to access the target base station; and send first period configuration information to the target base station and the terminal, where the first period configuration information is used to control the target base station to broadcast the target signal in the first period.

According to a sixth aspect of an example of the present disclosure, an apparatus for configuring a signal period is provided, including:

a processor; and a memory for storing processor-executable instructions;

where the processor is configured to:

receive first period configuration information, where the first period configuration information is sent by the macro base station when it is determined that a terminal currently accessing the macro base station is going to access the target base station; and broadcast a target signal in a first period indicated by the first period configuration information, where the target signal is used to control the terminal to access the target base station.

Technical solutions according to the examples of the present disclosure may include the following beneficial effects.

In an example of the present disclosure, when determining that a terminal currently accessing the macro base station is going to access a target base station, the macro base station may configure a first period for the target base station broadcasting a target signal according to a number of terminals currently accessing the target base station. The target base station is a base station that is used for hotspot coverage and managed by the macro base station, and the target signal is used to control the terminal to access the target base station. Further, the macro base station may send first period configuration information to the target base station and the terminal. The target base station will broadcast the target signal in the first period indicated by the first period configuration information, and the terminal will access the target base station by receiving the target signal broadcasted by the target base station in the first period. Through the above process, the macro base station may flexibly configure the first period for the target base station broadcasting the target signal according to the number of terminals accessing the target base station, thereby avoiding wasting resources of the target base station, facilitating energy saving of a 5G system, and reducing interference of the entire 5G system.

In an example of the present disclosure, when the macro base station configures the first period for the target base station broadcasting the target signal based on the number of terminals accessing the target base station, if the number of terminals currently accessing the target base station is zero, the macro base station may configure the first period for the target base station broadcasting the target signal within the preset period range; if the number of terminals currently accessing the target base station is not zero, the macro base station may directly take the current period configured for the target base station broadcasting the target signal as the first period. Through this process, the implementation is simple and has high availability. The problem of resource wastes caused by the target base station broadcasting the target signal with a fixed period in a case of no terminal accessing the target base station is avoided, and the interference of the 5G system is effectively reduced.

In an example of the present disclosure, after determining that the terminal accesses the target base station, the macro base station may determine whether the period for the target base station broadcasting the target signal is to be re-configured. If the re-configuration is necessary, the macro base station obtains the re-configured second period and sends the second period configuration information to the target base station and the terminal. The target base station will broadcast the target signal in the second period, and the terminal will store the second period configuration information, thereby ensuring synchronization between the period for the terminal receiving the target signal and the period for the target base station broadcasting the target signal.

In an example of the present disclosure, after determining that the terminal leaves the geographical range covered by the target base station, the macro base station may take the period previously configured for the target base station broadcasting the target signal as the third period, or configure the third period for the target base station broadcasting the target signal according to the number of terminals currently accessing the target base station. Further, the macro base station sends the third period configuration information to the target base station. The target base station still broadcasts the target signal in the third period based on the configuration of the macro base station. Through the above process, the third period for the target base station broadcasting the target signal may be configured after the terminal accessing the target base station leaves the geographical range covered by the target base station, thereby avoiding wasting resources of the target base station, facilitating the energy saving of the 5G system, and reducing the interference of the entire 5G system.

In an example of the present disclosure, the macro base station may also send the notification message carrying effective time information to the terminal. The effective time information is used to indicate the target base station will start broadcasting the target signal in the first period after the first preset time period is passed. Through the above process, the terminal may determine a time point from which the target base station starts broadcasting the target signal in the first period configured by the macro base station, thereby ensuring the synchronization between the period for the terminal receiving the target signal and the period for the target base station broadcasting the target signal.

In an example of the present disclosure, the target base station may broadcast the target signal in the first period indicated by the first period configuration information sent by the macro base station. The first period configuration information is determined by the macro base station according to the number of terminals currently accessing the target base station. Through the above process, the target base station may broadcast the target signal in the first period determined based on the number of terminals accessing the target base station, thereby avoiding wasting resources of the target base station and reducing the interference of the 5G system.

In an example of the present disclosure, the target base station may broadcast the target signal in the third period after the second preset time period is passed, thereby ensuring smooth switching of the periods for broadcasting the target signal after the terminal leaves the geographical range covered by the target base station.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 is a schematic diagram illustrating a scenario of configuring a signal period according to an example.

FIG. 2 is a flowchart illustrating a method of configuring a signal period according to an example.

DETAILED DESCRIPTION OF THE EMBODIMENTS

Figure 3:
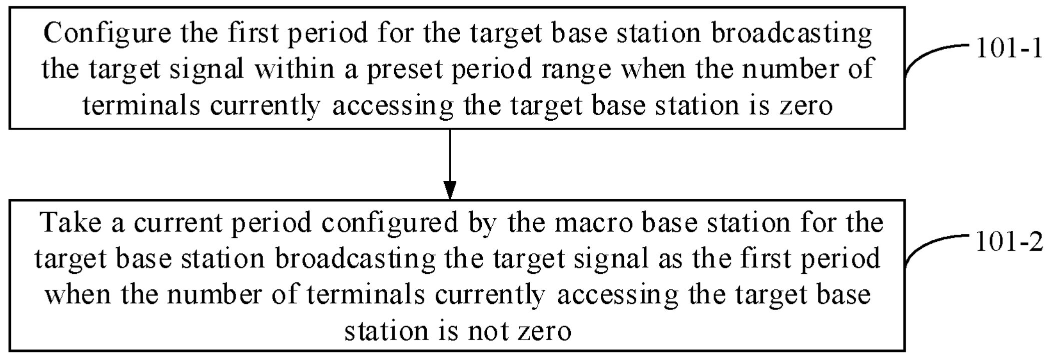
FIG. 3 is a flowchart illustrating another method of configuring a signal period according to an example.

Examples will be described in detail here with the examples thereof expressed in the drawings. Where the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The term used in the present disclosure is for the purpose of describing particular examples only and is not intended to limit the present disclosure. As used in this disclosure and the appended claims, the singular forms “a”, “an” and “the” are intended to include the plural forms as well, unless the context clearly indicates otherwise. It should also be understood that the term “and/or” as used herein refers to and includes any and all possible combinations of one or more of the associated listed items.

It shall be understood that, although the terms “first,” “second,” “third,” and the like may be used herein to describe various information, the information should not be limited by these terms. These terms are only used to distinguish one category of information from another. For example, without departing from the scope of the present disclosure, first information may be referred as second information; and similarly, second information may also be referred as first information. As used herein, the term “if” may be interpreted as “when” or “upon” or “in response to determining” depending on the context.

As shown in FIG. 1, a macro base station 11 is used for coverage, and a non-independent 5G small base station 12 managed by the macro base station is further used for hotspot coverage. The hotspot coverage is a hotspot that is set in a particular region and provided for users to surf Internet wirelessly. However, if no terminal accesses the small base station 12 used for the hotspot coverage, and the small base station 12 always broadcasts a target signal according to the related art, resource wastes of the small base station 12 are caused, unfavorable impact onto the system energy saving is caused, and the interference of the entire 5G system is increased.

To solve the above problem, the present disclosure provides a method of configuring a signal period, which may be applied to a macro base station 11 shown in FIG. 1. FIG. 2 is a flowchart illustrating a method of configuring a signal period according to an example. The method may include the following blocks.

At block 101, when it is determined that a terminal currently accessing the macro base station is going to access a target base station, a first period is configured for the target base station broadcasting a target signal according to a number of terminals currently accessing the target base station, where the target base station is a base station that is used for hotspot coverage and managed by the macro base station, and the target signal is used to control the terminal to access the target base station.

At block 102, first period configuration information is sent to the target base station and the terminal, where the first period configuration information is used to control the target base station to broadcast the target signal in the first period.

In the example, the macro base station may flexibly configure the first period for the target base station broadcasting the target signal according to the number of terminals currently accessing the target base station, thereby avoiding wasting resources of the target base station, facilitating the energy saving of the 5G system, and reducing the interference of the entire 5G system.

For the above block 101, the target base station is a base station that is used for hotspot coverage and is managed by the macro base station, e.g., the small base station 12 shown in FIG. 1. The target signal is used to control the terminal to access the target base station. Optionally, the target signal includes: a synchronization signal and key system information. The synchronization signal may include a Primary Synchronization Signal (PPS) and a Secondary Synchronization Signal (SSS). The key system information is the minimum system information required for a terminal to access a base station. Optionally, the key system information may be a Master Information Block (MIB).

At this block, if it is determined that a terminal currently accessing the macro base station is located in the area covered by the target base station, the macro base station determines that the terminal needs to access the target base station. At this time, the macro base station may configure the first period for the target base station broadcasting the target signal according to the number of terminals currently accessing the target base station.

Manners in which the macro base station configures the relatively reasonable period of the target base station broadcasting the target signal according to the number of terminals currently accessing the target base station include but not limited to the following manners.

When the number of terminals currently accessing the target base station is relative large, a smaller period value within a preset period range may be selected for the target base station, so that the target base station may broadcast the target signal to the outside more frequently. When the number of terminals currently accessing the target base station is relative small, a large period value within the above preset period range may be selected for the target base station, so that the target base station may broadcast the target signal less frequently. A maximum value of the preset period range may be infinity, and a minimum value may be determined according to an ability of the target base station itself.

For the above block 102, the macro base station may directly send the first period configuration information to the target base station through an interface with the target base station according to the related art. Further, the target base station broadcasts the target signal in the first period indicated by the first period configuration information.

In addition, the macro base station may send the first period configuration information to the terminal through an air interface with the terminal. In an example of the present disclosure, to enable the terminal to access the target base station, the macro base station may also send a re-direction instruction to the terminal. Based on the re-direction instruction, the terminal accesses the target base station after receiving the target signal broadcast by the target base station in the first period indicated by the first period configuration information.

In an example, FIG. 3 is a flowchart illustrating another method of configuring a signal period based on the example shown in FIG. 2. Block 101 may include:

At block 101-1, when the number of terminals currently accessing the target base station is zero, the first period for the target base station broadcasting the target signal is configured within a preset period range.

At this block, the target base station has previously reported the number of terminals currently accessing the target base station to the macro base station. If the number of terminals is zero, it indicates that no other terminal accesses the target base station yet. When configuring the first period, the macro base station may select a value within the preset period range and configure the value as a period value of the first period.

For example, the minimum value of the preset period range is $T_1$ and the maximum value of the preset period range is $T_2$. In this case, when the number of terminals currently accessing the target base station is zero, the macro station may select a commonly used value within the period value range of $[T_1, T_2]$, and the commonly used value is assumed to be $T_3$. Thus, $T_3$ is the first period for the target base station broadcasting the target signal configured by the macro base station.

It is to be noted that the same or different values of the first periods may be configured for the synchronization signal and the key system information in the target signal. That is, different periods may be configured for the synchronization signal and the key system information respectively, so that the target base station broadcasts the synchronization signal and the key system information in the corresponding configured periods.

At block 101-2, when the number of terminals currently accessing the target base station is not zero, a current period configured by the macro base station for the target base station broadcasting the target signal is taken as the first period.

In an example of the present disclosure, when the number of terminals is not zero, it indicates that other terminals already accesses the target base station. Thus, the macro base station already configures the period for the target base station broadcasting the target signal based on the number of terminals currently accessing the target base station.

At this block, the current period configured by the macro base station for the target base station broadcasting the target signal may be directly taken as the first period.

In the example, during process of the macro base station configuring the first period for the target base station broadcasting the target signal based on the number of terminals currently accessing the target base station, if the number of terminals currently accessing the target base station is zero, the macro base station may configure the first period for the target base station broadcasting the target signal within the preset period range; and if the number of terminals currently accessing the target base station is not zero, the macro base station may directly take the current period configured for the target base station broadcasting the target signal as the first period. Through this process, the implementation is simple and has high availability. The problem of resource wastes caused by the target base station broadcasting the target signal with a fixed period in a case of no terminal accessing the target base station is avoided, and the interference of the 5G system is effectively reduced.

Figure 4:
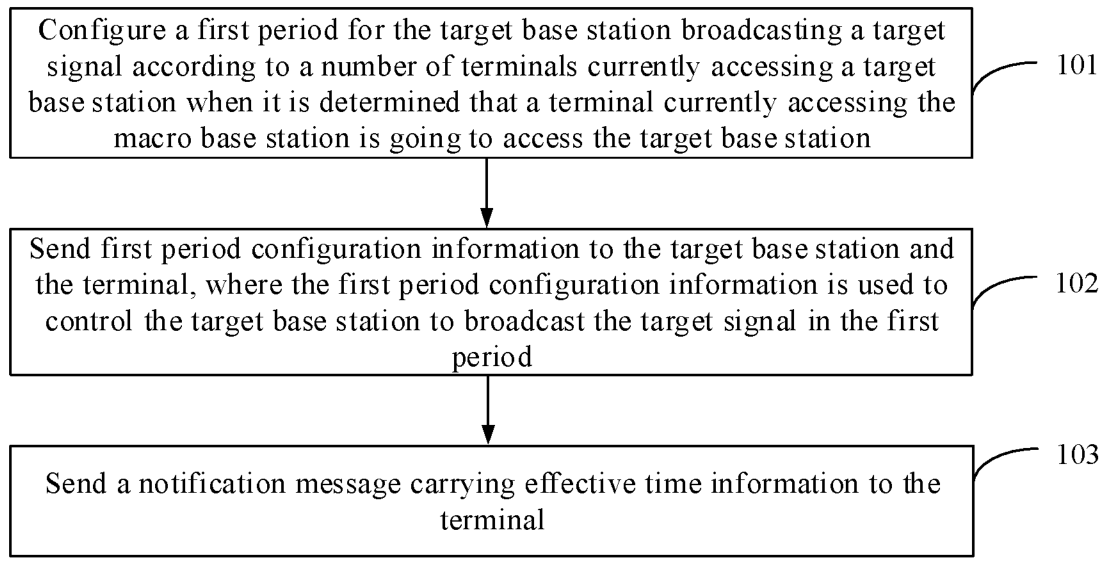
FIG. 4 is a flowchart illustrating another method of configuring a signal period according to an example.

In an example, FIG. 4 is a flowchart illustrating another method of configuring a signal period based on the example shown in FIG. 2. The above method of configuring a signal period may further include:

at block 103, a notification message carrying effective time information is sent to the terminal.

The effective time information is used to indicate that the target base station will start broadcasting the target signal in the first period after a first preset time period is passed.

In an example of the present disclosure, to ensure synchronization between the period for the target base station broadcasting the target signal and the period for the terminal receiving the target signal, the target base station starts timing when receiving the first period configuration information, and starts broadcasting the target signal in the first period after the first preset time period is passed.

At this block, the macro base station may send the notification message to the terminal, so that the terminal determines a time from which the target base station starts broadcasting the target signal in the first period, thereby ensuring the period synchronization.

Figure 5:
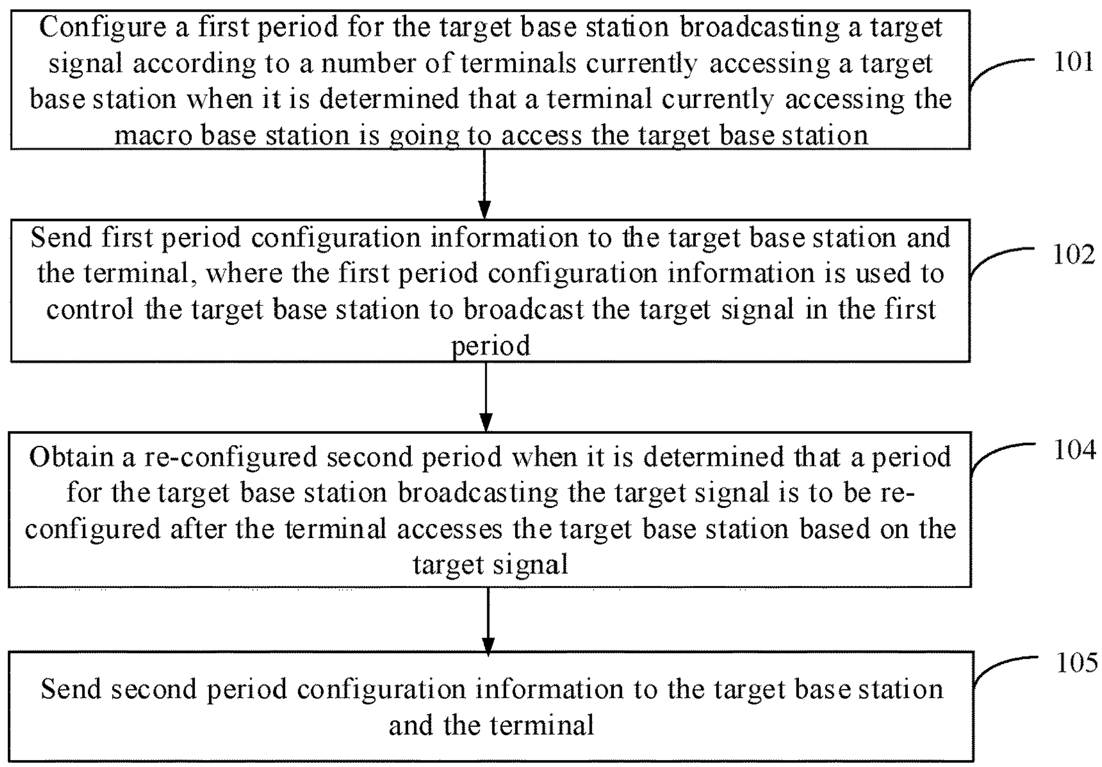
FIG. 5 is a flowchart illustrating another method of configuring a signal period according to an example.

In an example, FIG. 5 is a flowchart illustrating another method of configuring a signal period based on the example shown in FIG. 2. The above method of configuring a signal period may further include:

at block 104, after the terminal accesses the target base station based on the target signal, a re-configured second period is obtained when it is determined that a period for the target base station broadcasting the target signal is to be re-configured.

At this block, after determining that the terminal accesses the target base station based on the target signal, the macro base station may monitor in real time whether the period configured for the target base station broadcasting the target signal is changed.

In an example of the present disclosure, when a new terminal accesses the target base station or a terminal previously accessed the target base station leaves the geographical range covered by the target base station, the macro base station may re-configure the period for the target base station broadcasting the target signal.

At this block, the macro base station may obtain the re-configured second period according to the number of terminals currently accessing the target base station. The configuration is performed in the same manner as the macro base station configures the first period or the third period of the target signal when the terminal accesses the target base station or the terminal leaves the geographical range covered by the target base station, which is not described here.

At block 105, second period configuration information is sent to the target base station and the terminal.

At this block, the macro base station may also send the second period configuration information to the target base station through the interface with the target base station, and may send the second period configuration information to the terminal based on a flow and a method of updating system information.

Further, the target base station will broadcast the target signal in the second period, and the terminal will store the second period configuration information.

The macro base station will also notify other terminals currently accessing the target base station that the period for the target base station broadcasting the target signal is changed to the second period.

Through the above process, the synchronization between the period for the terminal receiving the target signal and the period for the target base station broadcasting the target signal is ensured.

Figure 6:
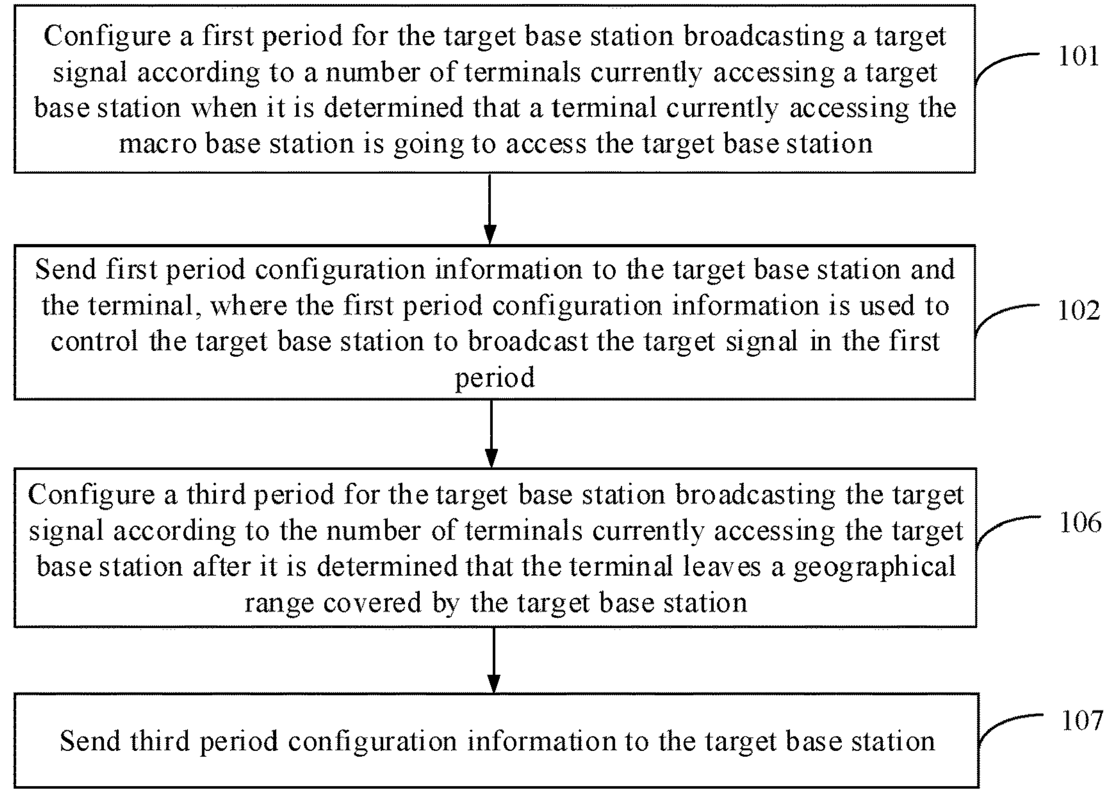
FIG. 6 is a flowchart illustrating another method of configuring a signal period according to an example.

In an example, FIG. 6 is a flowchart illustrating another method of configuring a signal period based on the example shown in FIG. 2. The above method of configuring a signal period may further include:

at block 106, after it is determined that the terminal leaves the geographical range covered by the target base station, a third period for the target base station broadcasting the target signal is configured according to the number of terminals currently accessing the target base station.

At this block, the macro base station may detect a position of the terminal according to the related art. If the terminal leaves the geographical range covered by the target base station, e.g., the terminal accesses a base station other than the target base station, the macro base station may configure the third period for the target base station broadcasting the target signal according to the number of terminals currently accessing the target base station.

At block 107, third period configuration information is sent to the target base station.

At this block, the macro base station may send the third period configuration information to the target base station according to the related art.

Optionally, the target base station may start timing when receiving the third period configuration information, and start broadcasting the target signal in the third period after the timing reaches a second preset time period. A time length of the second time period and a time length of the first time period may be identical or different.

In the above example, the third period for the target base station broadcasting the target signal may be configured after the terminal leaves the geographical range covered by the target base station, thereby avoiding wasting resources of the target base station, facilitating the energy saving of the 5G system, and reducing the interference of the entire 5G system.

Figure 7:
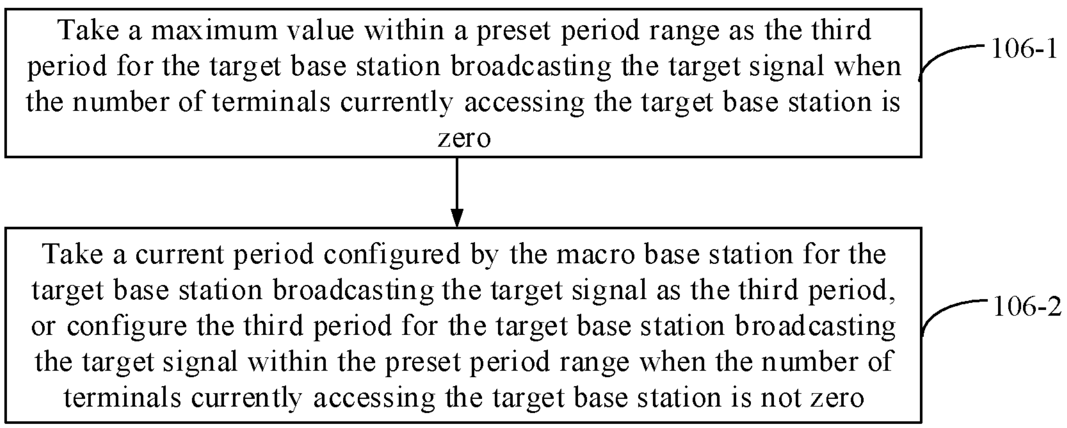
FIG. 7 is a flowchart illustrating another method of configuring a signal period according to an example.

In an example, FIG. 7 is a flowchart illustrating another method of configuring a signal period based on the example shown in FIG. 6. The block 106 may include the following blocks.

At block 106-1, when the number of terminals currently accessing the target base station is zero, a maximum value within the preset period range is taken as the third period for the target base station broadcasting the target signal.

At this block, if the number of terminals currently accessing the target base station is zero, it indicates that no other terminal accesses the target base station. At this time, the macro base station may take the maximum value within the previously preset period range as the third period for the target base station broadcasting the target signal.

Optionally, the maximum value may be infinity, and the target base station no longer broadcasts a downlink signal at this time. That is, when the terminal leaves the geographical range covered by the target base station and no other terminal accesses the target base station, the target base station may stop broadcasting the downlink signal, thereby achieving the purpose of energy saving of the base station.

At block 106-2, when the number of terminals currently accessing the target base station is not zero, a current period configured by the macro base station for the target base station broadcasting the target signal is taken as the third period, or the third period for the target base station broadcasting the target signal is configured within the preset period range.

At this block, if the number of terminals currently accessing the target base station is not zero, it indicates that there are other terminals still accessing the target base station after the terminal accesses another base station. At this time, the macro base station may still take the current period configured for the target base station broadcasting the target signal as the third period, that is, the previously configured period remains unchanged.

Alternatively, the macro base station may also configure, within the preset period range, the third period for the target base station broadcasting the target signal, that is, re-configure the period for the target base station broadcasting the target signal. The configuration is performed in the same manner as the above signal period is configured, which will not be described here.

Figure 8:
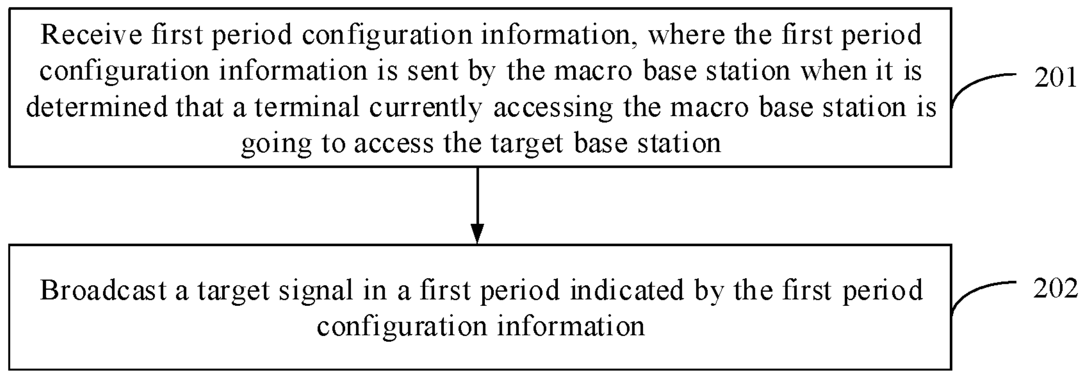
FIG. 8 is a flowchart illustrating another method of configuring a signal period according to an example.

The present disclosure further provides another method of configuring a signal period, which may be applied to a target base station that is used for hotspot coverage and managed by a macro base station, that is, the small base station 12 shown in FIG. 1. FIG. 8 is a flowchart illustrating another method of configuring a signal period according to an example. The method may include the following blocks.

At block 201, first period configuration information is received. Where, the first period configuration information is sent by the macro base station when the macro base station determines that a terminal currently accessing the macro base station is going to access the target base station.

At block 202, a target signal is broadcasted in a first period indicated by the first period configuration information.

Through the above process, the target base station may broadcast the target signal in the first period configured by the macro base station for the target base station according to a number of terminals currently accessing the target base station, thereby avoiding wasting resources of the target base station and reducing the interference of the 5G system.

For the block 201, in an example of the present disclosure, when determining that the terminal enters a range covered by the target base station, the macro base station determines that the terminal is going to access the target base station.

At this time, the macro base station may determine an appropriate first period for the target base station broadcasting the target signal according to the number of terminals currently accessing the target base station. In an example of the present disclosure, the target signal is used to control the terminal to access the target base station, and the target signal includes a synchronization signal and key system information.

At this block, the macro base station may send the first period configuration information to the target base station through an interface between the macro base station and the target base station according to the related art, and the target base station may directly receive the information.

For the block 202, the target base station broadcasts the target signal in the first period after receiving the first period configuration information.

For example, a previous period for the target base station broadcasting the target signal may be infinity, that is, the target base station does not send any downlink signal before a terminal accesses the target base station. And when the terminal needs to access the target base station, the target base station may be caused to broadcast the target signal in the first period configured by the macro base station.

In addition, in an example of the present disclosure, the periods of the synchronization signal and the key system information may be same or different. For example, the target base station broadcasts the synchronization signal in a particular period, and broadcasts the key system information in another period. The periods of broadcasting the synchronization signal and the key system information are both configured by the macro base station for the target base station.

In an example, the above block 202 may include:

broadcasting the target signal in the first period indicated by the first period configuration information after a first preset time period is passed.

In an example of the present disclosure, the target base station does not immediately broadcast the target signal in the first period when receiving the first period configuration information, but starts broadcasting the target signal in the first period after the first preset time period is passed. Meanwhile, the macro base station already sends the notification message carrying effective time information to the terminal, where the effective time information is used to indicate that the target base station will start broadcasting the target signal in the first period after the first preset time period is passed.

Through the above process, the synchronization between a period for the terminal receiving the target signal and the period for the target base station broadcasting the target signal may be ensured.

Figure 9:
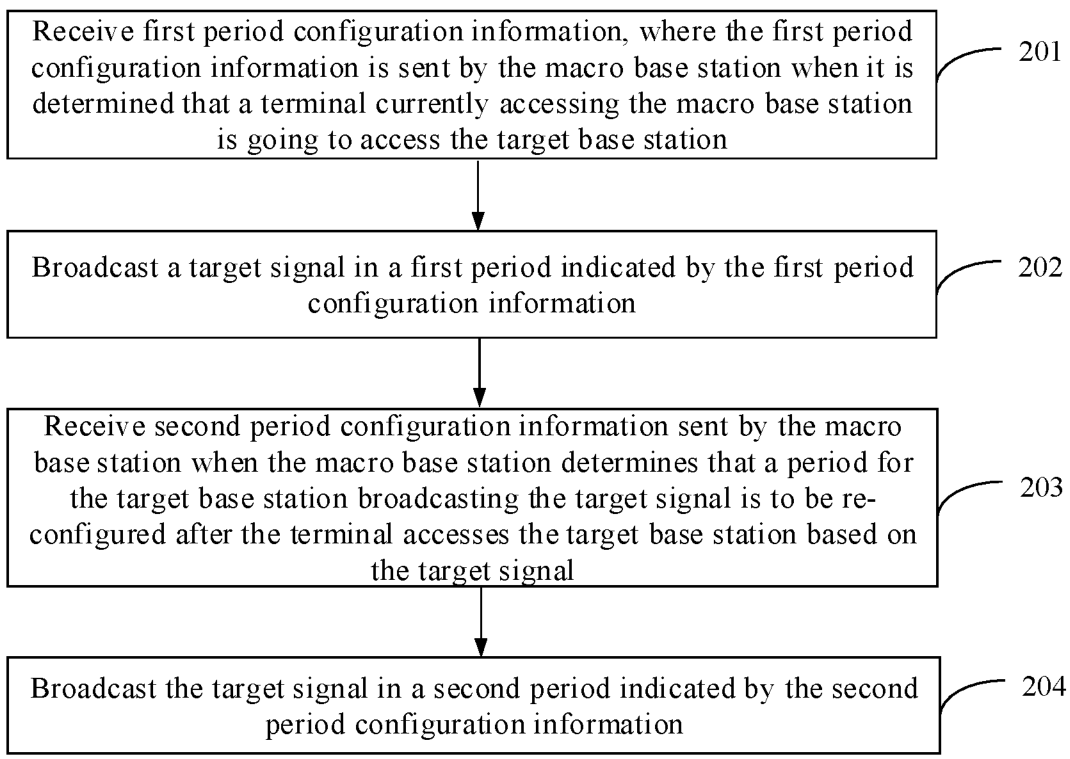
FIG. 9 is a flowchart illustrating another method of configuring a signal period according to an example.

In an example, FIG. 9 is a flowchart illustrating another method of configuring a signal period based on the example shown in FIG. 8. The above method may further include:

at block 203, second period configuration information is received. Where, the second period configuration information is sent by the macro base station when the terminal accesses the target base station based on the target signal and then it determines that the period for the target base station broadcasting the target signal is to be re-configured.

At this block, after the terminal accesses the target base station based on the target signal, when determining that the period for the target base station broadcasting the target signal is to be re-configured, the macro base station sends the second period configuration information to the target base station. The target base station may directly receive the information.

At block 204, the target signal is broadcast in a second period indicated by the second period configuration information.

At this block, the target base station may adjust the period for broadcasting the target signal by itself to the second period.

Optionally, the target base station may start broadcasting the target signal in the second period only after a particular preset time period is passed from reception of the second period configuration information, and the macro base station may also notify, by a notification message, the terminal that the target base station will start broadcasting the target signal in the second period after the preset time period is passed, thereby ensuring the synchronization between the period for the terminal receiving the target signal and the period for the target base station broadcasting the target signal.

In the example, the target base station adjusts the period for broadcasting the target signal according to period configuration information sent by the macro base station, thereby avoiding wasting resources of the target base station, facilitating the energy saving of the 5G system, and reducing the interference of the entire 5G system.

Figure 10:
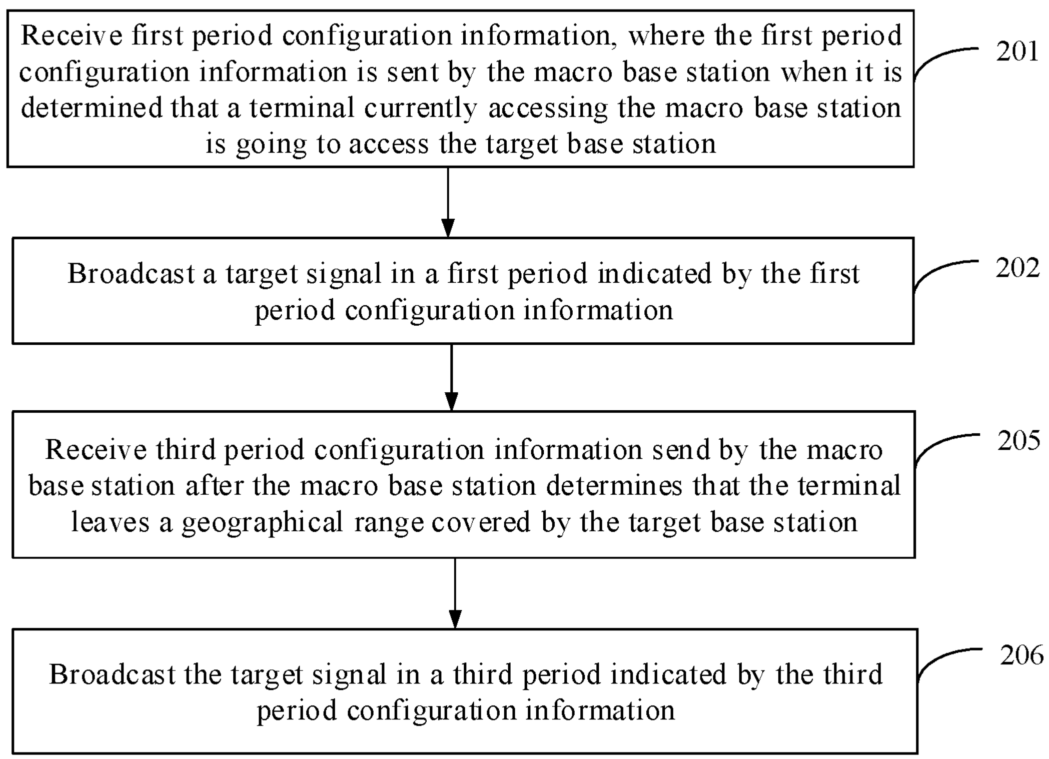
FIG. 10 is a flowchart illustrating another method of configuring a signal period according to an example.

In an example, FIG. 10 is a flowchart illustrating another method of configuring a signal period based on the example shown in FIG. 8. The above method of configuring a signal period may further include:

at block 205, third period configuration information sent by the macro base station after the macro base station determines that the terminal leaves a geographical range covered by the target base station is received.

At this block, the macro base station will send the third period configuration information to the target base station when determining that the terminal leaves the geographical range covered by the target base station, and the target base station may directly receive the information.

At block 206, the target signal is broadcast in a third period indicated by the third period configuration information.

At this block, the target base station may adjust the period for broadcasting the target signal broadcast by itself to the third period.

In the example, the target base station adjusts the period for broadcasting the target signal according to the period configuration information sent by the macro base station, thereby avoiding wasting resources of the target base station, facilitating the energy saving of the 5G system, and reducing the interference of the entire 5G system.

In an example, the above block 206 may include:

broadcasting the target signal in the third period indicated by the third period configuration information after a second preset time period is passed.

In an example of the present disclosure, to ensure smooth switching of the periods for broadcasting the target signal after the terminal leaves the geographical range covered by the target base station, the target base station may start broadcasting the target signal in the third period after the second preset time period is passed.

It is to be noted that before a period indicated by any piece of the above period configuration information previously received by the target base station becomes effective, if the target base station receives another piece of period configuration information, the target base station broadcasts the target signal in a period indicated by the last received period configuration information.

For example, the target base station currently broadcasts the target signal in a period $T_4$. At this time, the target base station receives the period configuration information instructing the target base station to broadcast the target signal in a period $T_5$ sent by the macro base station. Normally, the target base station starts broadcasting the target signal in the period $T_5$ after a time period t is passed. However, if the target base station receives another piece of period configuration information sent by the macro base station before the time period t is passed, where the another period configuration information instructs the target base station to broadcast the target signal in a period $T_6$, the target base station may start broadcasting the target signal in the period $T_6$ after the time period t is passed.

In the example, the base station broadcasts the target signal in the period indicated by the latest received period configuration information sent by the macro base station, thereby avoiding wasting resources of the target base station, facilitating the energy saving of the 5G system, and reducing the interference of the entire 5G system.

Figure 11:
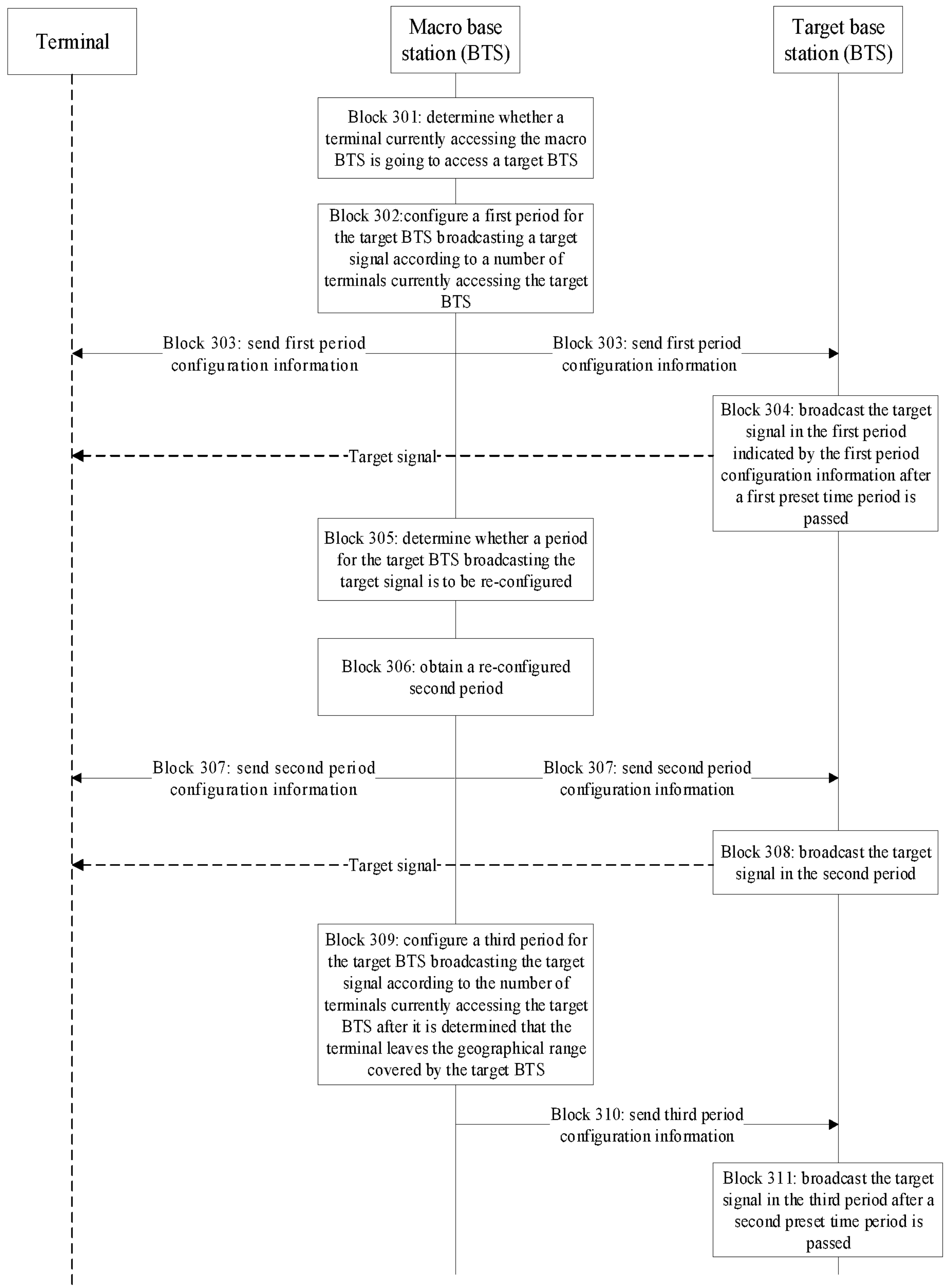
FIG. 11 is a flowchart illustrating another method of configuring a signal period according to an example.

The present disclosure further provides another method of configuring a signal period. FIG. 11 is a flowchart illustrating another method of configuring a signal period according to an example. The method may include the following blocks.

At block 301, a macro base station determines whether a terminal currently accessing the macro base station is going to access a target base station.

If the terminal is going to access the target base station, block 302 is continued.

At block 302, the macro base station configures a first period of broadcasting a target signal for the target base station according to a number of terminals currently accessing the target base station.

When the number of terminals is zero, the macro base station configures the first period for the target base station broadcasting the target signal within a preset period range. When the number of terminals is not zero, the macro base station takes a current period configured for the target base station broadcasting the target signal as the first period.

At block 303, the macro base station sends first period configuration information to the target base station and the terminal.

At block 304, the target base station broadcasts the target signal in the first period indicated by the first period configuration information after a first preset time period is passed.

Correspondingly, based on a re-direction instruction sent by the macro base station, the terminal receives the target signal broadcasted by the target base station according to the first period configuration information, thereby accessing the target base station.

At block 305, the macro base station determines whether a period for the target base station broadcasting the target signal is to be re-configured.

If it is determined that the period for the target base station broadcasting the target signal is to be re-configured, block 306 is performed. Otherwise, block 309 is performed.

At block 306, the macro base station obtains a re-configured second period.

At block 307, the macro base station sends second period configuration information to the target base station and the terminal.

At block 308, the target base station broadcasts the target signal in the second period.

At block 309, after determining that the terminal leaves a geographical range covered by the target base station, the macro base station configures a third period for the target base station broadcasting the target signal according to the number of terminals currently accessing the target base station.

At block 310, the macro base station sends third period configuration information to the target base station.

At block 311, the target base station broadcasts the target signal in the third period after a second preset time period is passed.

In the above example, the macro base station configures the period for the target base station broadcasting the target signal based on the number of terminals currently accessing the target base station, thereby avoiding wasting resources of the target base station, facilitating the energy saving of the 5G system, and reducing the interference of the entire 5G system.

For the foregoing method examples, for the sake of brevity, they are all described as a series of combinations of actions, but those skilled in the art should understand that the present disclosure is not limited by the described order of actions, because according to the present disclosure, some steps may be performed in other orders or at the same time.

Next, those skilled in the art should also understand that the examples described in the specification are optional examples, and the actions and modules involved are not necessarily required by the present disclosure.

Corresponding to the foregoing examples of methods of implementing with applied functions, the present disclosure further provides examples of apparatuses and corresponding terminals for implementing with applied functions.

Figure 12:
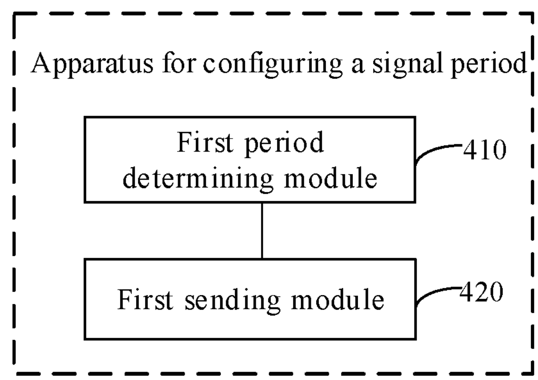
FIG. 12 is a block diagram illustrating an apparatus for configuring a signal period according to an example.

FIG. 12 is a block diagram illustrating an apparatus for configuring a signal period according to an example. The apparatus includes:

a first period determining module 410, configured to configured to set a first period for a target base station broadcasting a target signal according to a number of terminals currently accessing the target base station when it is determined that a terminal currently accessing the macro base station is going to access the target base station, where the target base station is a base station that is used for hotspot coverage and managed by the macro base station, and the target signal is used to control the terminal to access the target base station; and a first sending module 420, configured to send first period configuration information to the target base station and the terminal, where the first period configuration information is used to control the target base station to broadcast the target signal in the first period.

Figure 13:
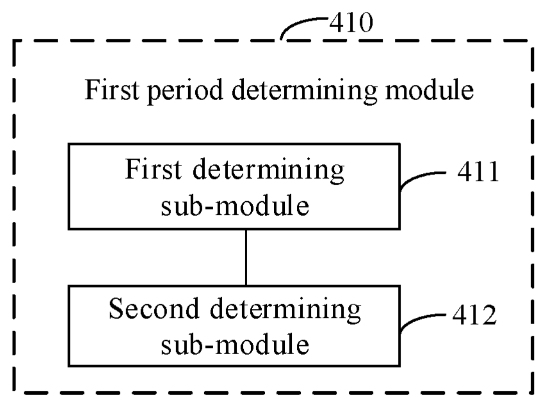
FIG. 13 is a block diagram illustrating another apparatus for configuring a signal period according to an example.

FIG. 13 is a block diagram illustrating another apparatus for configuring a signal period on the basis of the example shown in FIG. 12. The first period determining module 410 includes:

a first determining sub-module 411, configured to set the first period for the target base station broadcasting the target signal within a preset period range when the number of terminals currently accessing the target base station is zero; and a second determining sub-module 412, configured to take a current period configured by the macro base station for the target base station broadcasting the target signal as the first period when the number of terminals currently accessing the target base station is not zero.

Figure 14:
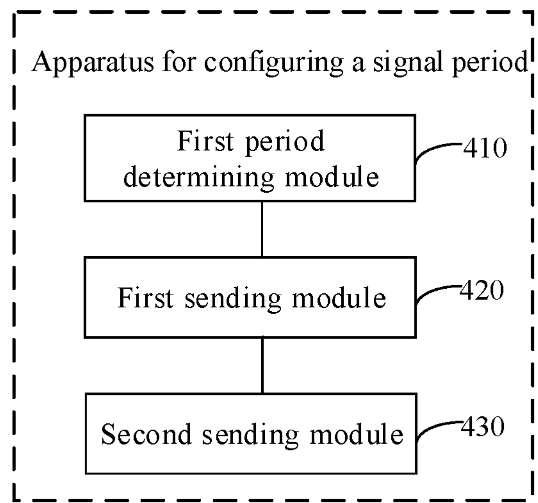
FIG. 14 is a block diagram illustrating another apparatus for configuring a signal period according to an example.

FIG. 14 is a block diagram illustrating another apparatus for configuring a signal period on the basis of the example shown in FIG. 12. The apparatus further includes:

a second sending module 430, configured to send a notification message carrying effective time information to the terminal, where the effective time information is used to indicate that the target base station will start broadcasting the target signal in the first period after a first preset time period is passed.

Figure 15:
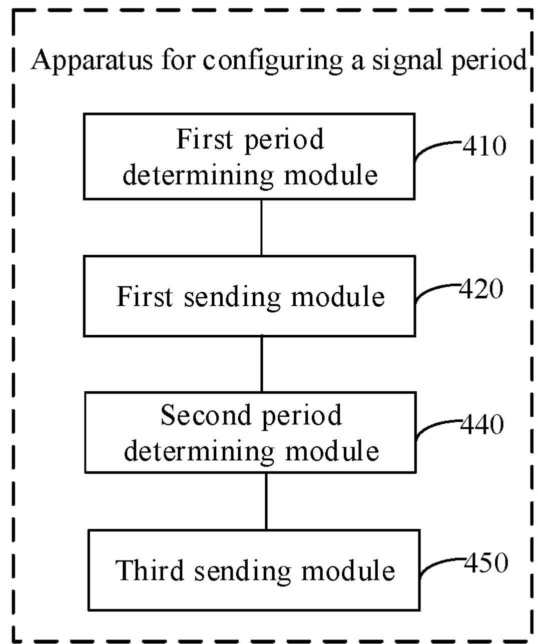
FIG. 15 is a block diagram illustrating another apparatus for configuring a signal period according to an example.

FIG. 15 is a block diagram illustrating another apparatus for configuring a signal period on the basis of the example shown in FIG. 12. The apparatus further includes:

a second period determining module 440, configured to obtain a re-configured second period when it is determined that a period for the target base station broadcasting the target signal is to be re-configured after the terminal accesses the target base station based on the target signal; and a third sending module 450, configured to send second period configuration information to the target base station and the terminal, where the second period configuration information is used to control the target base station to broadcast the target signal in the second period.

Figure 16:
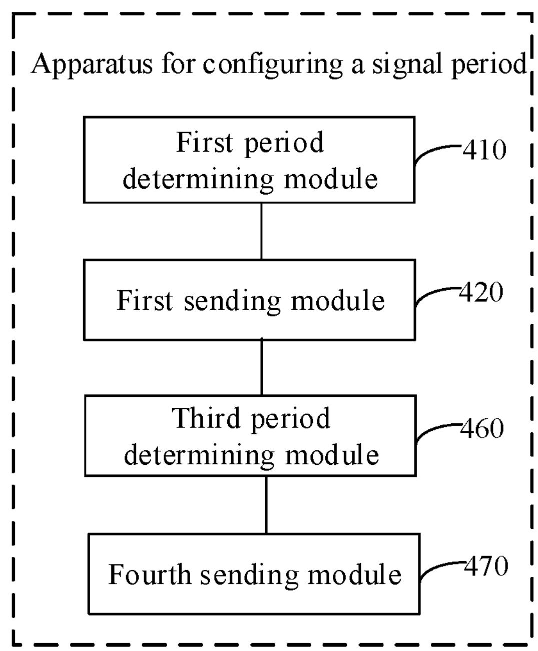
FIG. 16 is a block diagram illustrating another apparatus for configuring a signal period according to an example.

FIG. 16 is a block diagram illustrating another apparatus for configuring a signal period on the basis of the example shown in FIG. 12. The apparatus further includes:

a third period determining module 460, configured to set a third period for the target base station broadcasting the target signal according to the number of terminals currently accessing the target base station after it is determined that the terminal leaves a geographical range covered by the target base station; and a fourth sending module 470, configured to send third period configuration information to the target base station, where the third period configuration information is used to control the target base station to broadcast the target signal in the third period.

Figure 17:
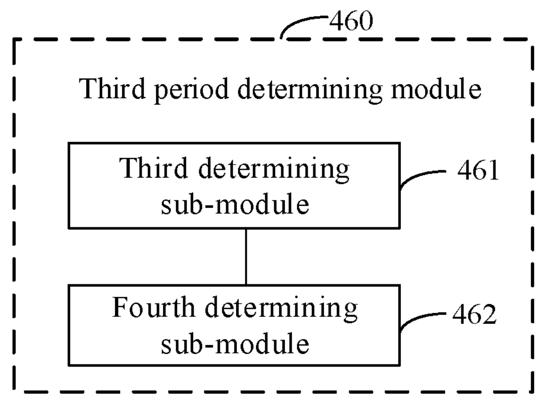
FIG. 17 is a block diagram illustrating another apparatus for configuring a signal period according to an example.

FIG. 17 is a block diagram illustrating another apparatus for configuring a signal period on the basis of the example shown in FIG. 16. The third period determining module 460 includes:

a third determining sub-module 461, configured to take a maximum value within a preset period range as the third period for the target base station broadcasting the target signal when the number of terminals currently accessing the target base station is zero; and a fourth determining sub-module 462, configured to, when the number of terminals currently accessing the target base station is not zero, take a current period configured by the macro base station for the target base station broadcasting the target signal as the third period as the third period or set the third period for the target base station broadcasting the target signal within the preset period range.

Figure 18:
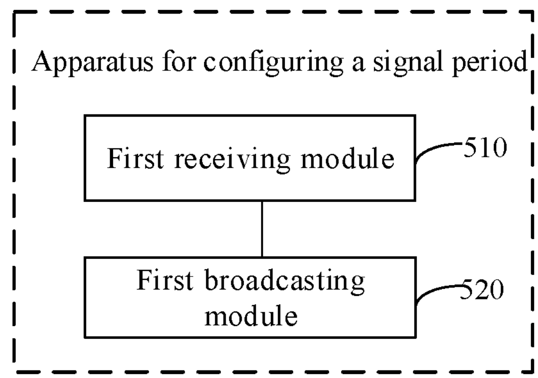
FIG. 18 is a block diagram illustrating another apparatus for configuring a signal period according to an example.

FIG. 18 is a block diagram illustrating another apparatus for configuring a signal period according to an example. The apparatus includes:

a first receiving module 510, configured to receive first period configuration information, where the first period configuration information is sent by the macro base station when it is determined that a terminal currently accessing the macro base station is going to access the target base station; and a first broadcasting module 520, configured to broadcast a target signal in a first period indicated by the first period configuration information, where the target signal is used to control the terminal to access the target base station.

Figure 19:
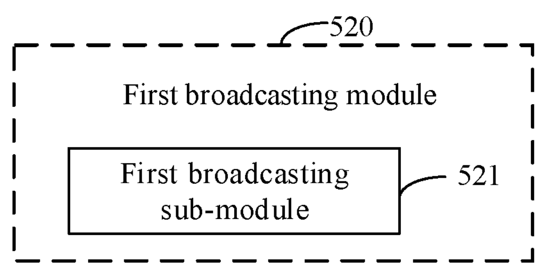
FIG. 19 is a block diagram illustrating another apparatus for configuring a signal period according to an example.

FIG. 19 is a block diagram illustrating another apparatus for configuring a signal period on the basis of the example shown in FIG. 18. The first broadcasting module 520 includes:

a first broadcasting sub-module 521, configured to broadcast the target signal in the first period indicated by the first period configuration information after a first preset time period is passed.

Figure 20:
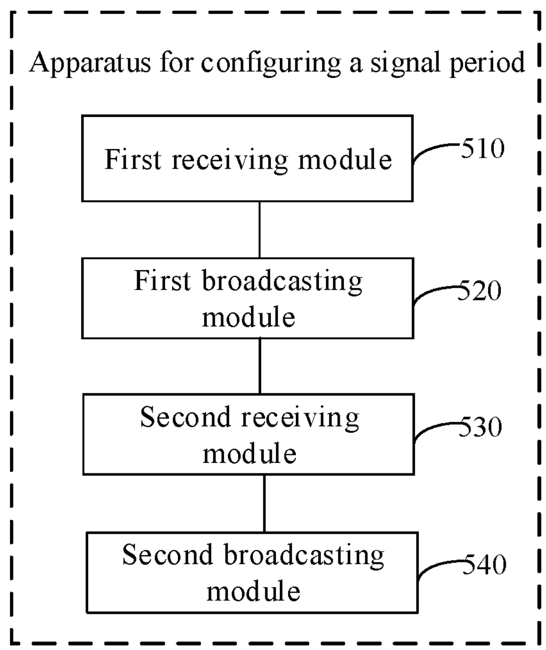
FIG. 20 is a block diagram illustrating another apparatus for configuring a signal period according to an example.

FIG. 20 is a block diagram illustrating another apparatus for configuring a signal period on the basis of the example shown in FIG. 18. The apparatus further includes:

a second receiving module 530, configured to receive second period configuration information sent by the macro base station when the macro base station determines that a period for the target base station broadcasting the target signal is to be re-configured after the terminal accesses the target base station based on the target signal; and a second broadcasting module 540, configured to broadcast the target signal in a second period indicated by the second period configuration information.

Figure 21:
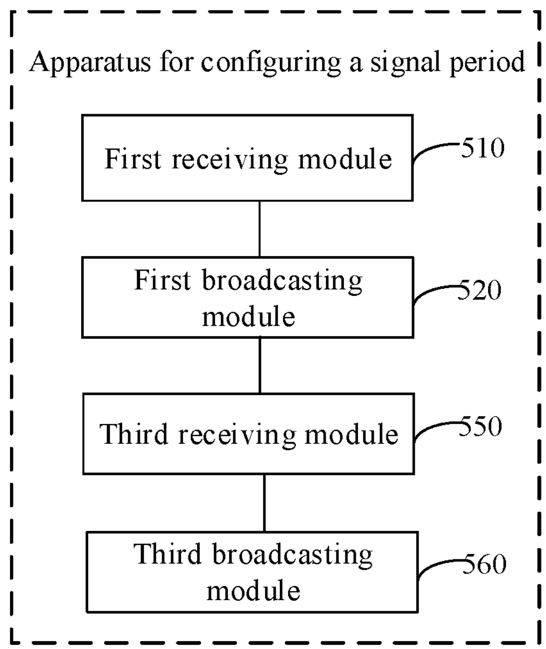
FIG. 21 is a block diagram illustrating another apparatus for configuring a signal period according to an example.

FIG. 21 is a block diagram illustrating another apparatus for configuring a signal period on the basis of the example shown in FIG. 18. The apparatus further includes:

a third receiving module 550, configured to receive third period configuration information send by the macro base station after the macro base station determines that the terminal leaves a geographical range covered by the target base station; and a third broadcasting module 560, configured to broadcast the target signal in a third period indicated by the third period configuration information.

Figure 22:
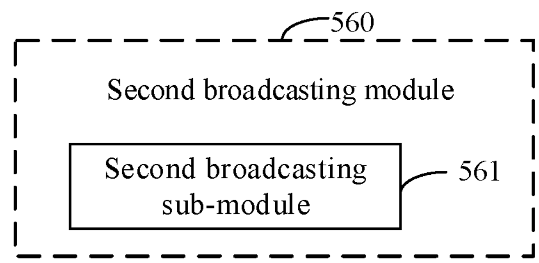
FIG. 22 is a block diagram illustrating another apparatus for configuring a signal period according to an example.

FIG. 22 is a block diagram illustrating another apparatus for configuring a signal period on the basis of the example shown in FIG. 21. The third broadcasting module 560 includes:

a second broadcasting sub-module 561, configured to broadcast the target signal in the third period indicated by the third period configuration information after a second preset time period is passed.

For apparatus examples, since the apparatus examples substantially correspond to the method examples, reference may be made to the partial description of the method examples. The apparatus examples described above are merely illustrative, where the units described as separate components may or may not be physically separated, and the components displayed as units may or may not be physical units, e.g., may be located in one place, or may be distributed to a plurality of network elements. Part or all of the modules may be selected according to actual requirements to achieve the objectives of the solutions in the present disclosure. Those of ordinary skill in the art may understand and implement them without creative work.

Correspondingly, an example of the present disclosure further provides an apparatus for configuring a signal period, including:

a processor; and a memory for storing processor-executable instructions;

where the processor is configured to:

set a first period for the target base station broadcasting a target signal according to a number of terminals currently accessing a target base station when it is determined that a terminal currently accessing the macro base station is going to access the target base station, where the target base station is a base station that is used for hotspot coverage and managed by the macro base station, and the target signal is used to control the terminal to access the target base station; and send first period configuration information to the target base station and the terminal, where the first period configuration information is used to control the target base station to broadcast the target signal in the first period.

Figure 23:
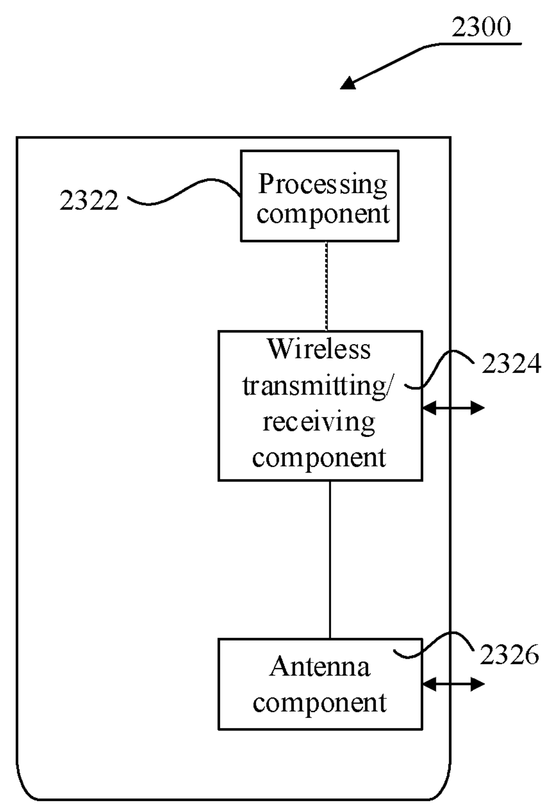
FIG. 23 is a schematic structural diagram illustrating an apparatus for configuring a signal period according to an example of the present disclosure.

FIG. 23 is a schematic diagram illustrating a structure of an apparatus 2300 for configuring a signal period according to an example. The apparatus 2300 may be a macro base station. As shown in FIG. 23, the apparatus 2300 includes a processing component 2322, a wireless transmitting/receiving component 2324, an antenna component 2326, and a signal processing part unique to a wireless interface. The processing component 2322 may further include one or more processors.

One processor in the processing components 2322 may be configured to:

set a first period for the target base station broadcasting a target signal according to a number of terminals currently accessing a target base station when it is determined that a terminal currently accessing the macro base station is going to access the target base station, where the target base station is a base station that is used for hotspot coverage and managed by the macro base station, and the target signal is used to control the terminal to access the target base station; and send first period configuration information to the target base station and the terminal, where the first period configuration information is used to control the target base station to broadcast the target signal in the first period.

Correspondingly, an example of the present disclosure further provides an apparatus for configuring a signal period, including:

a processor; and a memory for storing processor-executable instructions;

where the processor is configured to:

receive first period configuration information, where the first period configuration information is sent by the macro base station when it is determined that a terminal currently accessing the macro base station is going to access the target base station; and broadcast a target signal in a first period indicated by the first period configuration information, where the target signal is used to control the terminal to access the target base station.

Figure 24:
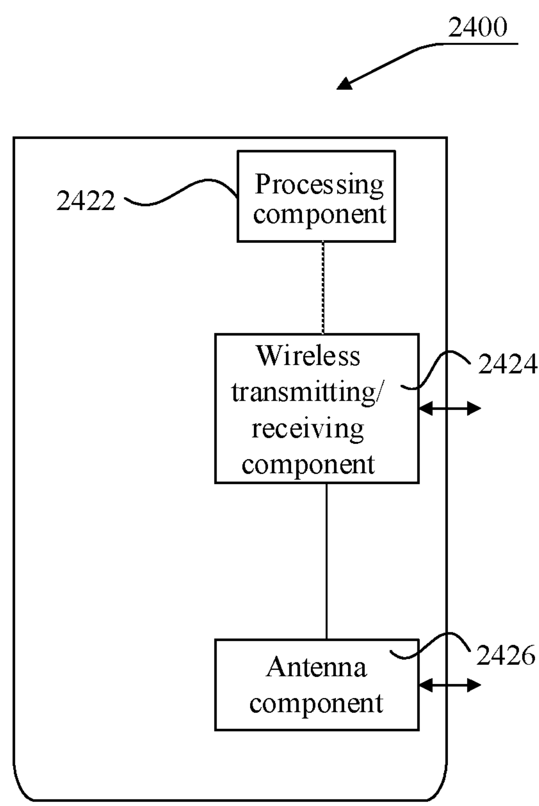
FIG. 24 is a schematic structural diagram illustrating another apparatus for configuring a signal period according to an example of the present disclosure.

FIG. 24 is a schematic diagram illustrating a structure of an apparatus 2400 for configuring a signal period according to an example. The apparatus 2400 may be a target base station, and the target base station is used for hotspot coverage and managed by a macro base station. As shown in FIG. 24, the apparatus 2400 includes a processing component 2422, a wireless transmitting/receiving component 2424, an antenna component 2426, and a signal processing part unique to a wireless interface. The processing component 2422 may further include one or more processors.

One processor in the processing components 2422 may be configured to:

receive first period configuration information, where the first period configuration information is sent by the macro base station when it is determined that a terminal currently accessing the macro base station is going to access the target base station; and broadcast a target signal in a first period indicated by the first period configuration information, where the target signal is used to control the terminal to access the target base station.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of configuring a signal period, the method being applied to a macro base station, and comprising:

when it is determined that a terminal currently accessing the macro base station is going to access a target base station, configuring a first period for the target base station broadcasting a target signal according to a number of terminals currently accessing the target base station, wherein the target base station is a base station that is used for hotspot coverage and managed by the macro base station, and the target signal is used to control the terminal to access the target base station; and sending the first period to the target base station and the terminal, and controlling the target base station to broadcast the target signal according to the first period.

2. The method according to claim 1, wherein configuring the first period for the target base station broadcasting the target signal according to the number of terminals currently accessing the target base station comprises:

when the number of terminals currently accessing the target base station is zero, configuring the first period for the target base station broadcasting the target signal within a preset period range; and when the number of terminals currently accessing the target base station is not zero, taking a current period configured by the macro base station for the target base station broadcasting the target signal as the first period.

3. The method according to claim 1, further comprising: sending a notification message carrying effective time information to the terminal, wherein the effective time information is used to indicate that the target base station will start broadcasting the target signal in the first period after a first preset time period is passed.

4. The method according to claim 1, further comprising: after the terminal accesses the target base station based on the target signal, obtaining a second period when it is determined that a period for the target base station broadcasting the target signal is to be re-configured; and sending the second period to the target base station and the terminal, and controlling the target base station to broadcast the target signal according to the second period.

5. The method according to claim 1, further comprising: after it is determined that the terminal leaves a geographical range covered by the target base station, configuring a third period for the target base station broadcasting the target signal according to the number of terminals currently accessing the target base station; and sending the third period to the target base station, and controlling the target base station to broadcast the target signal according to the third period.

6. The method according to claim 5, wherein configuring the third period for the target base station broadcasting the target signal according to the number of terminals currently accessing the target base station comprises:

when the number of terminals currently accessing the target base station is zero, taking a maximum value within a preset period range as the third period for the target base station broadcasting the target signal; and when the number of terminals currently accessing the target base station is not zero, taking a current period configured by the macro base station for the target base station broadcasting the target signal as the third period, or configuring the third period for the target base station broadcasting the target signal within the preset period range.

7. An apparatus for configuring a signal period, comprising:

a processor; and a memory for storing processor-executable instructions, wherein the processor is configured to:

set a first period for a target base station broadcasting a target signal according to a number of terminals currently accessing the target base station when it is determined that a terminal currently accessing the macro base station is going to access the target base station, wherein the target base station is a base station that is used for hotspot coverage and managed by the macro base station, and the target signal is used to control the terminal to access the target base station; and send the first period to the target base station and the terminal, and control the target base station to broadcast the target signal according to the first period.

8. The apparatus according to claim 7, wherein configuring the first period for the target base station broadcasting the target signal according to the number of terminals currently accessing the target base station comprises:

when the number of terminals currently accessing the target base station is zero, configuring the first period for the target base station broadcasting the target signal within a preset period range; and when the number of terminals currently accessing the target base station is not zero, taking a current period configured by the macro base station for the target base station broadcasting the target signal as the first period.

9. The apparatus according to claim 7, the processor is further configured to:

send a notification message carrying effective time information to the terminal, wherein the effective time information indicates that the target base station will start broadcasting the target signal in the first period after a first preset time period is passed.

10. The apparatus according to claim 7, the processor is further configured to:

after the terminal accesses the target base station based on the target signal, obtain a second period when it is determined that a period for the target base station broadcasting the target signal is to be re-configured; and send the second period to the target base station and the terminal, and control the target base station to broadcast the target signal in the second period.

11. The apparatus according to claim 7, the processor is further configured to:

after it is determined that the terminal leaves a geographical range covered by the target base station, set a third period for the target base station broadcasting the target signal according to the number of terminals currently accessing the target base station; and send the third period to the target base station, and control the target base station to broadcast the target signal in the third period.

12. The apparatus according to claim 11, wherein configuring the third period for the target base station broadcasting the target signal according to the number of terminals currently accessing the target base station comprises:

when the number of terminals currently accessing the target base station is zero, taking a maximum value within a preset period range as the third period for the target base station broadcasting the target signal; and when the number of terminals currently accessing the target base station is not zero, taking a current period configured by the macro base station for the target base station broadcasting the target signal as the third period, or configuring the third period for the target base station broadcasting the target signal within the preset period range.

13. An apparatus for configuring a signal period, comprising:

a processor; and a memory for storing processor-executable instructions, wherein the processor is configured to:

receive first period configuration information, wherein the first period configuration information is sent by a macro base station when it is determined that a terminal currently accessing the macro base station is going to access a target base station; and broadcast a target signal in a first period indicated by the first period configuration information, wherein the target signal is used to control the terminal to access the target base station;

wherein broadcasting the target signal in the first period indicated by the first period configuration information comprises: after a first preset time period is passed, broadcasting the target signal in the first period indicated by the first period configuration information.

14. The apparatus according to claim 13, the processor is further configured to:

receive second period configuration information sent by the macro base station when the macro base station determines that a period for the target base station broadcasting the target signal is to be re-configured after the terminal accesses the target base station based on the target signal; and broadcast the target signal in a second period indicated by the second period configuration information.

15. The apparatus according to claim 13, the processor is further configured to:

receive third period configuration information send by the macro base station after the macro base station determines that the terminal leaves a geographical range covered by the target base station; and broadcast the target signal in a third period indicated by the third period configuration information.

16. The apparatus according to claim 15, wherein broadcasting the target signal in the third period indicated by the third period configuration information comprises:

after a second preset time period is passed, broadcasting the target signal in the third period indicated by the third period configuration information.

* * * * *